United States Patent [19]
Hinokimoto

[11] Patent Number: 5,357,543
[45] Date of Patent: Oct. 18, 1994

[54] DATA COMMUNICATION EQUIPMENT

[75] Inventor: Shinichi Hinokimoto, Kawasaki, Japan

[73] Assignee: Fujitsu Limited, Kawasaki, Japan

[21] Appl. No.: 850,022

[22] Filed: Mar. 12, 1992

[30] Foreign Application Priority Data

Mar. 15, 1991 [JP] Japan .................. 3-050056

[51] Int. Cl.5 .................................. H04B 3/46
[52] U.S. Cl. ........................ 375/10; 370/111
[58] Field of Search ............... 375/5, 10, 7; 370/80, 370/91, 110.1, 111, 118

[56] References Cited

U.S. PATENT DOCUMENTS

| 4,151,373 | 4/1979 | Widmer et al. | 370/111 |
| 4,330,858 | 5/1982 | Choquet | 370/111 |
| 4,354,265 | 10/1982 | Nyberg et al. | 370/111 |
| 4,437,183 | 3/1984 | Profet | 370/111 |

Primary Examiner—Stephen Chin
Attorney, Agent, or Firm—Staas & Halsey

[57] ABSTRACT

A data communication equipment is provided in a public communication network for transmitting a series of block data including a time space having no signal between two successive block data neighboring each other. The data communication equipment includes a discriminator for discriminating the time space from the series of block data and a transmitter transmitting a line hold signal for filling the time space during the time space.

15 Claims, 7 Drawing Sheets

DATA COMMUNICATION EQUIPMENT

FIELD OF THE INVENTION

The present invention relates to data communication equipment provided in a public communication network, and in particular, to a data communication equipment transmitting a series of block data including or during a time space usually having no signal, between two successive block data neighboring each other in a series of block data.

A public communication network, particularly a public switched telephone network is widely used for a data transmission. When the data transmission is performed through a long transmission line, it is well known that transmission characters for transmitting the data through the long transmission line are varied or affected in correspondence with the characteristics of the line conditions.

At the present time, tremendous amounts of data are transmitted through the public communication network. Therefore, if the data are transmitted in series of block data including a time space having no signal, which will be called a "no-signal space" hereinafter, between two successive block data neighboring each other, there is a case where other signals are inserted into the no-signal spaces for utilizing the transmission line more effectively. This insertion of other signals into the no-signal spaces will be called "signal insertion" hereinafter. When the no-signal spaces are diverted to or used for other signals, the transmission characters of the block data transmitted through a transmission line are varied differently from the transmission characters varied in a case where the block data are transmitted through the transmission line without occurrence of the signal insertion. For example, when block data such as facsimile block data due to images on a plurality of pages are changed in speed so as to be transmitted through a high speed transmission line such as an international high speed communication line, the no-signal spaces each appearing between two facsimile block data read from two succeeding pages are happened to be diverted to or used with other data, for increasing the data transmission efficiency on the international high speed transmission line. As a result, the transmission characters of the facsimile block data transmitted through the international high speed communication line are varied by how much or in relation with how the no-signal spaces are diverted to other data. As a result, the errors are easily produced after the signal insertion occurs, which decreases the transmission efficiency. In consideration of the above problem, the data communication equipment is required to have always a high transmission efficiency through the data communication equipment may transmit through any high speed transmission line.

DESCRIPTION OF THE RELATED ART

When data are transmitted from one data communication equipment to another data communication equipment through the public switched telephone network, it must be considered that errors occur in the data transmission line of the network. Usually, the data communication equipment is used for both transmitting and receiving the data. When the data communication equipment is used for receiving the data, the equipment always watches or monitors whether there are errors in the received data. When one data communication equipment (the first data communication equipment) sends data to another data communication equipment (the second data communication equipment) through the transmission line and the second data communication equipment detects errors in the received data, the second data communication equipment commands the first data communication equipment so without errors instead of to resend the same data as the data received with the errors. When the first data communication equipment receives the command, the first data communication equipment resends the data to the second data communication equipment so that the second data communication equipment receives the correct data. If the errors occur in high frequency, not only the data transmission efficiency but also the data transmission quality is reduced. In case of transmitting the block data, the data resending command is performed from the second to the first data communication equipment during or using the no-signal spaces. Therefore, the transfer rate of the block data is reduced and the data transmission quality is also reduced every time the error occurs. In order to protect errors from occurring in high frequency, in other words, in order to increase the transfer rate and the transmission quality of the block data, a training sequence is generally performed between the first and the second data communication equipment through the transmission line before the series of block data are transmitted. The training sequence is performed for predetermining the data transmission characters adequate for transmitting the block data through the transmission line. However, if the signal insertion occurs in high frequency during or using the no-signal spaces, the data transmission characteristics initially determined by the training sequence do not correspond with the data transmission characteristics appearing in the actual data transmission of the block data. This results in increasing the error correction and reducing the transfer rate and the transmission quality of the block data, which has been a problem in cases where the data communication equipment transmits the block data.

Figure 1:
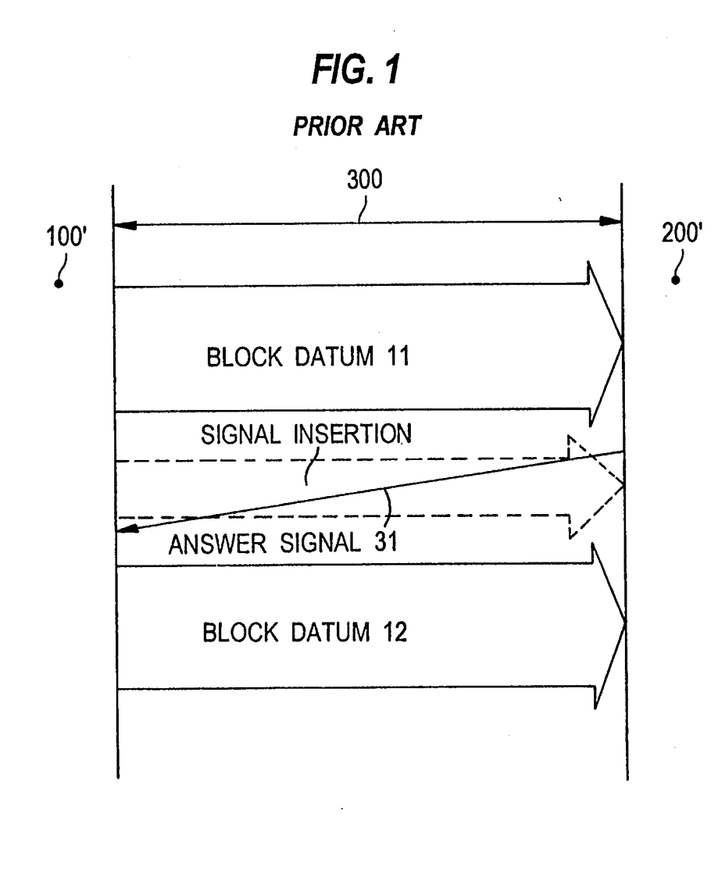
FIG. 1 is an illustration for showing the problem occurring in the prior art.

FIG. 1 illustrates the problem stated above. In FIG. 1, a block datum 11 is transmitted from a data communication equipment 100' in the transmission mode of the block data to a data communication equipment 200' in the reception mode of the block data through a data transmission line 300 in the public switched telephone network. Another block datum 12 is transmitted after block datum 11 is sent and also a no-signal space has passed. During the no-signal space, the signal insertion occurs, as depicted by "SIGNAL INSERTION" in FIG. 1; since the transmission characteristics are changed, errors occur with considerable frequency, which results in decreasing the transfer rate and the transmission quality of the block data.

In order to explain the present application, a facsimile equipment recommended by CCITT T.30, T.4, V.21 and V.29 is employed for the data communication equipment. As explained before, the facsimile equipment transmits the image block datum for each page of a document. Therefore, the facsimile equipment transmits a series of image block data for a plurality of pages of the document.

Figure 2:
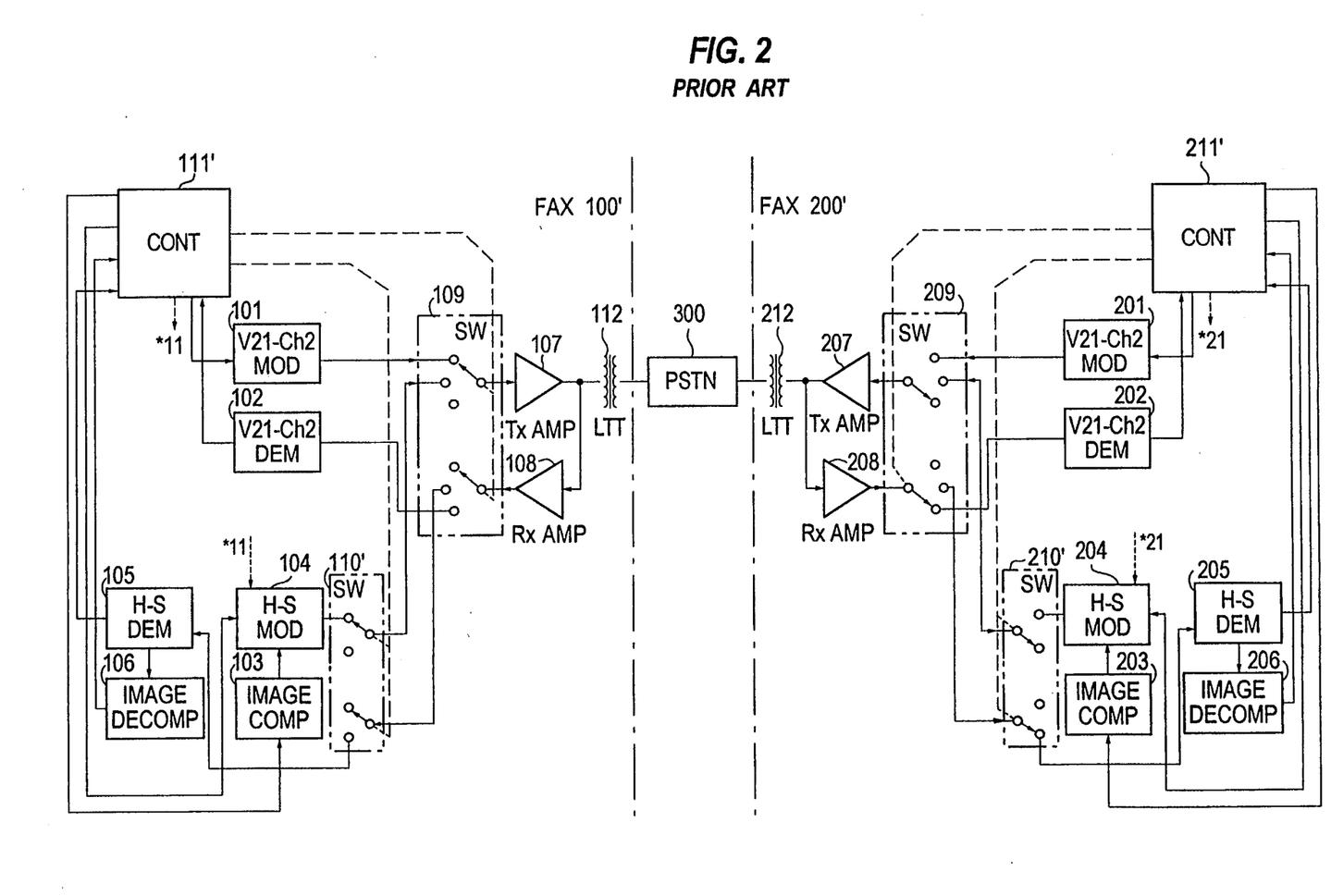
FIG. 2 is a schematic block diagram of two facsimile equipments (FAXes 100' and 200') of the prior art, showing a facsimile equipment (FAX 100') in the transmission mode and another facsimile equipment (FAX 200') in the reception mode of the facsimile image block data.

FIG. 2 is a schematic block diagram of two facsimile equipments (FAXes) 100' and 200' of the related art, in which only units relating to the present invention are represented. FIG. 2 shows a case where FAXes 100' and 200' are connected each other through a public switched telephone network (PSTN) 300, for transmitting the image block data from FAX 100' to FAX 200'. The FAXes 100' and 200' have the same constitution so that the boxes in FAXes 100' and 200' having the same label or description have the same function as each other.

In FIG. 2, a control unit (CONT) 111' in FAX 100' outputs control signals for controlling the training sequence and the transmission of the image block data, and a control unit (CONT) 211' in FAX 200' outputs control signals for controlling the training sequence and the reception of the image block data. In accordance with CCITT V21, the control signals are modulated by a low speed channel 2 modulator and the control signals are demodulated by a low speed channel 2 demodulator. The former and the latter are depicted as "V21-ch2 MOD" and "V21-ch2 DEM" in FIG. 2 with reference numerals 101 and 102 in FAX 100' and 201 and 202 in FAX 200' respectively. The control signals are transmitted between CONTs 111' and 211' by using a predetermined protocol.

In FAX 100', a plurality of image block signals are produced by reading pages one by one, including the no-signal spaces, at an image reading unit not depicted in FIG. 2. The image block signals from the image reading unit are compressed by an image compressor (IMAGE COMP) 103 and modulated to the image block data by a high speed modulator (H-S MOD) 104. The H-S MOD 104 produces the image block data having a high speed and including the no-signal spaces.

In FAX 200', the image data sent from FAX 100' are demodulated by a high speed demodulator (H-S DEM) 205 and decompressed by an image decompressor (IMAGE DECOMP) 206 so as to be printed out on the papers by an image printing unit not depicted in FIG. 2. This transmission protocol is provided in accordance with CCITT T.30, the IMAGE COMP 203 and IMAGE DECOMP 206 are provided in accordance with T.4, and H-S MOD 204 and H-S DEM 205 are provided in accordance with CCITT V.29.

The CONTs 111' and 211' each include a respective microprocessor and they operate under a predetermined program. In accordance with the well known facsimile transmission protocol, the control signals are sent and received between CONTs 100' and 200' and the image block data are sent from FAX 100' to FAX 200' by the operation of microprocessors in CONTs 111' and 211'. For example, the control such as CALL of FAXes 100' and 200', Preprocessing/Postprocessing of the image data and Connecting and Disconnecting of the line between FAXes 100' and 200' is performed. Furthermore, CONTs 111' and 211' control respective switches (SW) 109 and SW 110' in FAX 100' and SWes 209 and 210' in FAX 200'. The SWes 109 and 209 operate respectively for sending or receiving the control signals or the image data. The FAXes 100' and 200' can take either the transmission mode or the reception mode of the image block data respectively. The SWes 110' and 210' in FIG. 2 make connection so that FAX 100' is in the transmission mode and FAX 200' is in the reception mode under the control of CONTs 111' and 211' respectively.

In FAXes 100' and 200', there are transmitting amplifiers (Tx AMPs) 107 and 201 and receiving amplifiers (Rx AMP) 108 and 208 respectively. The Tx AMP 107 in FAX 100' is for amplifying the control signals and the image block data, thereby to send them to FAX 200' through a line terminal transformer (LTT) 112 and PSTN 300, and Rx AMP 208 in FAX 200' is for amplifying the control signals and the image data, as received thereby from FAX 100' through PSTN 300 and LTT 212. The LTT 112 is located at a signal in-and-out side of FAX 100', and Tx AMP 107 and Rx AMP 108 are located between LTT 110 and SW 109. In FAX 200', Tx AMP 207 and Rx AMP 208 have the same respective functions as Tx AMP 107 and Rx AMP 108 in FAX 100' respectively.

The training sequence is generally performed between the facsimile equipments before sending the image block data, by sending a training signal from the facsimile equipment in the transmission mode to the facsimile equipment in the reception mode. In FIG. 2, the training signal is produced in FAX 100' and sent to FAX 200' through PSTN 300. The training signal is produced in CONT 111' and sent to H-S MOD 104. In H-S MOD 104, there is a circuit, not depicted in FIG. 2, for determining the transmission speeds of the training signal and the image block data, under the control of CONT 111'. Therefore, in H-S MOD 104, the training signal is modulated to the analog training signal and determined to have a transmission speed which is adequate to be transmitted to FAX 200' through PSTN 300. The training signal is modulated to the analog training signal and determined to have a transmission speed, deemed to be or which is adequate, to be transmitted to FAX 200' through PSTN 300. The modulated training signal output from H-S MOD 104 is transferred to Tx AMP 107 through SWes 110' and 109 and amplified so as to be sent to FAX 200' through LTT 112 and PSTN 300. The modulated training signal, upon arrival at FAX 200' is sent to H-S DEM 205 through LTT 212, Rx AMP 208 and SWes 209 and 210'. In H-S DEM 205, the modulated analog training signal is demodulated to the former state of a digital training signal. There is an automatic equalizer or a timing tracking circuit, which are not depicted in FIG. 2, in H-S DEM 205. The transmission characters for transmitting the training signal through PSTN 300 can be obtained from the operating state of the automatic equalizer or the timing tracking circuit. The information about the operating state is held in a circuit, not depicted in FIG. 2, in H-S DEM 205 so as to be used when H-S DEM 205 demodulates the image block data. The demodulated training signal is sent to CONT 211' and is checked to determine whether the demodulated training signal is proper, in other words, to determine whether the transmission characters are suitable for transmitting the training signal. This check is performed with reference to the information on the transmission speed of the training signal, determined at H-S MOD 104 in FAX 100'. Thereupon, the information on the transmission speed of the training signal is sent from CONT 111' to CONT 211' through V21-ch2 MOD 101, SW 109, Tx AMP 107, LTT 122, PSTN 300, LTT 212, Rx AMP 208, SW 209 and V21-ch2 DEM 202. The checked results are informed from CONT 211' to CONT 111' through V21-ch2 MOD 201, SW 209, Tx AMP 207, LTT 212, PSTN 200, LTT 112, Rx AMP 108, SW 109 and V21-ch2 DEM 102.

If the checked results are improper, CONT 111' controls H-S MOD 104 again so as to change the transmission speed of the modulated training signal, which will be called simply "the training signal" hereinafter if nothing interferes, to a more proper speed for the transmission of the training signal. When the proper speed is obtained, the transmission speed of the training signal is fixed, in other words, the transmission speed of the image block data is fixed. Then, the training sequence is over.

After the training sequence is over, the image block data are transmitted from FAX 100' to FAX 200' through PSTN 300 under the control of CONT 111' and then printed at FAX 200' under the control of CONT 211' as follows:

- (step 1') the first image block signal of the first page is read by the image reading unit, the read image block signal is compressed by IMAGE COMP 103, the compressed image block signal is modulated to the first image block datum by H-S MOD 104 so that the first image block datum has the suitable speed as determined by the training sequence;
- (step 2') the first image block datum produced at H-S MOD 104 is sent to Tx AMP 107 through SWes 110' and 109 and amplified so as to be sent to FAX 200' through LTT 112 and PSTN 300;
- (step 3') when the first image block datum is sent to FAX 200', the first image block datum is sent to Rx AMP 208 through LTT 212 and amplified;
- (step 4') the first image block datum amplified at Rx AMP 208 is sent to H-S DEM 205 through SWes 209 and 210';
- (step 5') the first image block datum arrived at H-S DEM 205 is demodulated to the first demodulated image signal and sent to IMAGE DECOMP 206;
- (step 6') the first demodulated image signal is decompressed by IMAGE DECOMP 206 and the first decompressed image signal is sent to CONT 211';
- (step 7') the first decompressed image signal sent to CONT 211' is checked at CONT 211', to determine whether errors exist in the first decompressed image signal;
- (step 8') if there is no error in the first decompressed image signal, CONT 211' informs to CONT 111' that no error is included in the first decompressed image signal and CONT 211' controls the image printing unit which thereupon prints the first image on a sheet, using the first decompressed image signal sent from IMAGE DECOMP 206;
- (step 9') if there are errors in the first decompressed image signal, CONT 211' informs the errors to CONT 111', then CONT 111' controls the image reading unit, IMAGE COMP 103, H-S MOD 104 and SW 109 so that the first image block datum, or a part thereof having errors, is resent to FAX 200' through PSTN 300;
- (step 10') when the first image block datum is resent to FAX 200', the same steps as steps 3' to 10';
- (step 11') when CONT 111' receives the information that no error exists in the first image block signal as stated in step 8', CONT 111' controls FAX 100' so that the second image datum is sent to FAX 200' after the first no-signal space provided between the first and the second image block datum is over or passed by repeating the same steps as stated in steps 1' to 10' for the second image datum and signal; and
- (step 12') when the last image block datum read from the last page is sent from FAX 100' to FAX 200' and there is no error in the last image signal sent to FAX 200', the sending of the image datum is stopped.

In the above steps in the prior art, there is a problem that the no-signal spaces in the image block data are left free, as stated about the first no-signal space in step 11'. Therefore, the signal insertion occurs during the no-signal spaces.

SUMMARY OF THE INVENTION

Therefore, the present invention has the following objects.

An object of the present invention is to improve the transmission quality of the block data.

Another object of the present invention is to increase the transfer rate of the block data.

Still another object of the present invention is to increase the transmission efficiency of the block data.

The above objects are achieved by protecting or preventing the signal insertion from occurring in the no-signal spaces. The protection can be performed by filling the no-signal spaces with a signal individually. The signal will be called a "line holding signal" hereinafter. When the block data are transmitted from a first data communication equipment to a second data communication equipment through the data transmission line, the first data communication equipment discriminates the no-signal space from the block data, generates the line holding signal and sends the line holding signal to the second data communication equipment so as to fill the no-signal space with the line holding signal. Since the no-signal spaces are filled with the line holding signal, the block data becomes a kind of continuous signal, so that the signal insertion never occurs. The training sequence is performed by using the training signal the same as such continuous signal. Therefore, the data transmission characters determined by the training sequence are never varied in the actual transmission characters of the transmitted block data. This results in improving transmission quality and increasing the transmission efficiency and the transfer rate of the block data.

DESCRIPTION OF THE PREFERRED EMBODIMENTS

Figure 3:
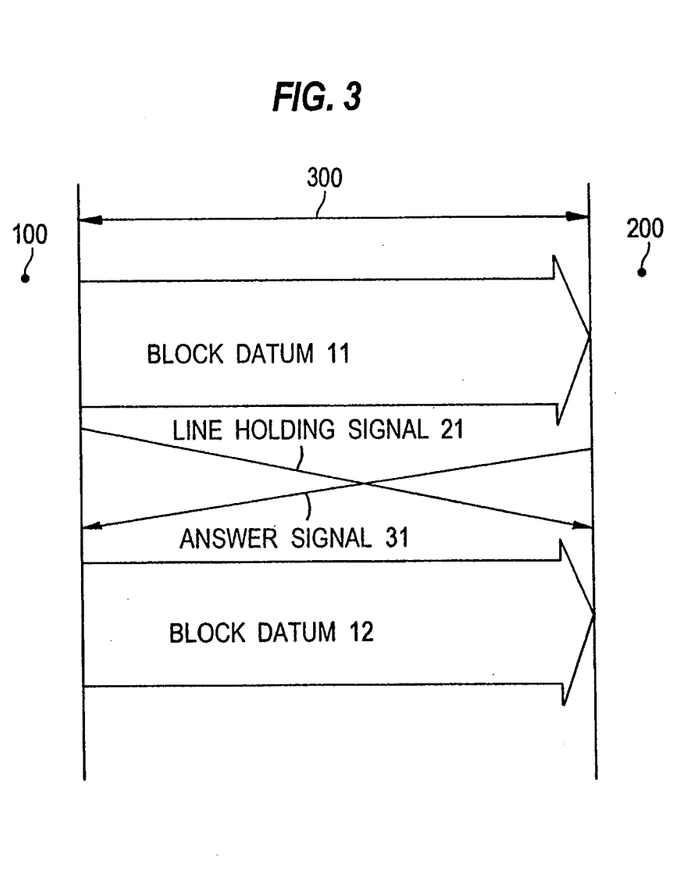
FIG. 3 is a illustration for showing the principle of the present invention.

FIG. 3 illustrates a principle of the present invention. In FIG. 3, a block datum 11 is transmitted from a data communication equipment 100 in the transmission mode to a data communication equipment 200 in the reception mode through the data transmission line 300 in the public switched telephone network and another block datum 12 is transmitted after block datum 11 is sent and a time period equal to the no-signal space is over. In the prior art, the time period is the no-signal space as stated before in reference to FIG. 1. However, in the present invention, another signal called a line holding signal 21 is sent from the data communication equipment 100 to the data communication equipment 200 during the time period. In other words, the no-signal spaces are individually filled with the line holding signal 21 in the present invention. As stated in reference to FIG. 1, the answer signal 31 is sent from the data communication equipment 200 to the data communication equipment 100, so that the line holding signal 21 and the answer signal 31 cross each other during the time period. This results in protecting the signal insertion from occurring in the no-signal spaces.

Figure 4:
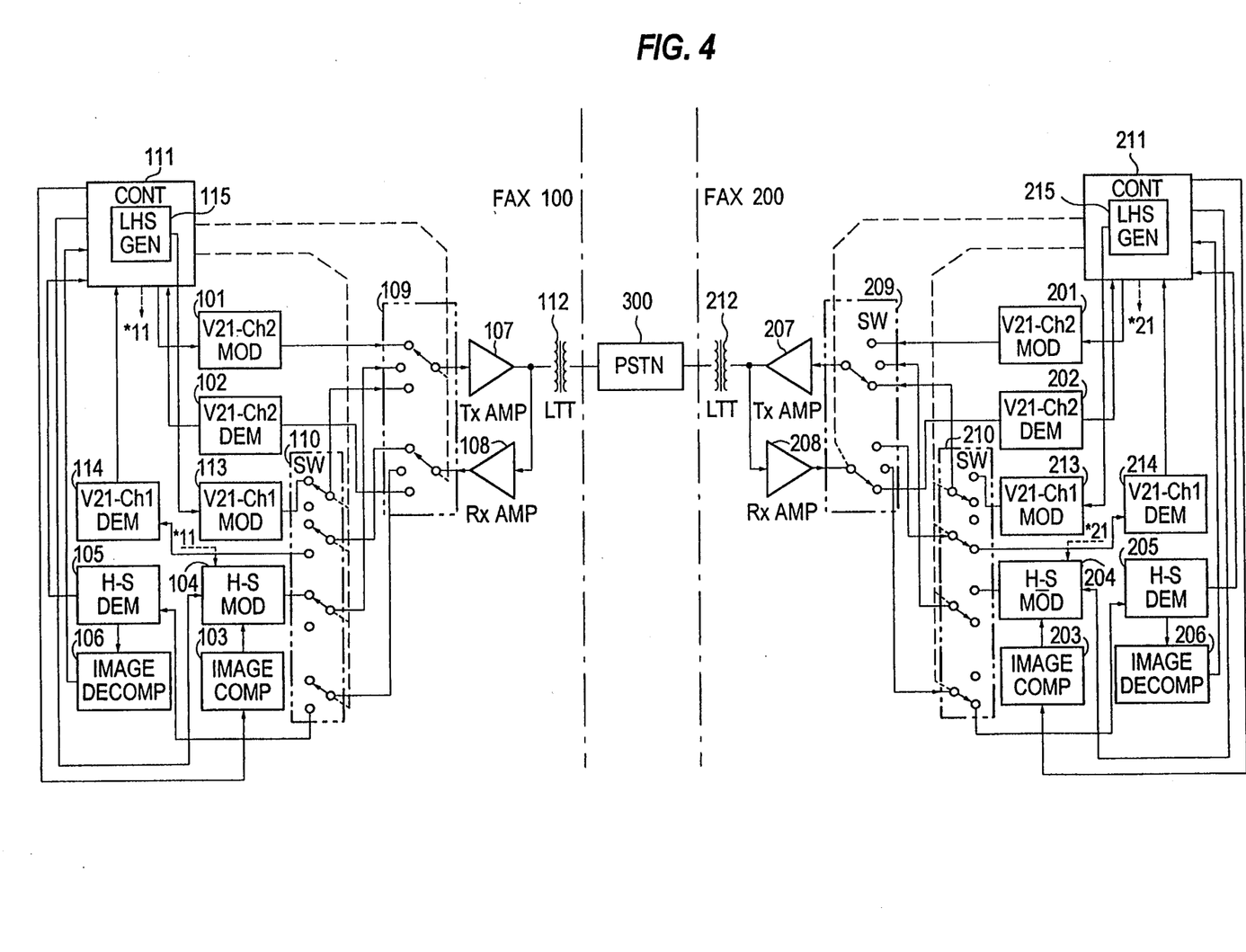
FIG. 4 is a schematic block diagram of two facsimile equipments (FAXes 100 and 200) embodying the present invention, showing a facsimile equipment (FAX 100) in the transmission mode and another facsimile equipment (FAX 200) in the reception mode of the facsimile image block data.
Figure 5A:
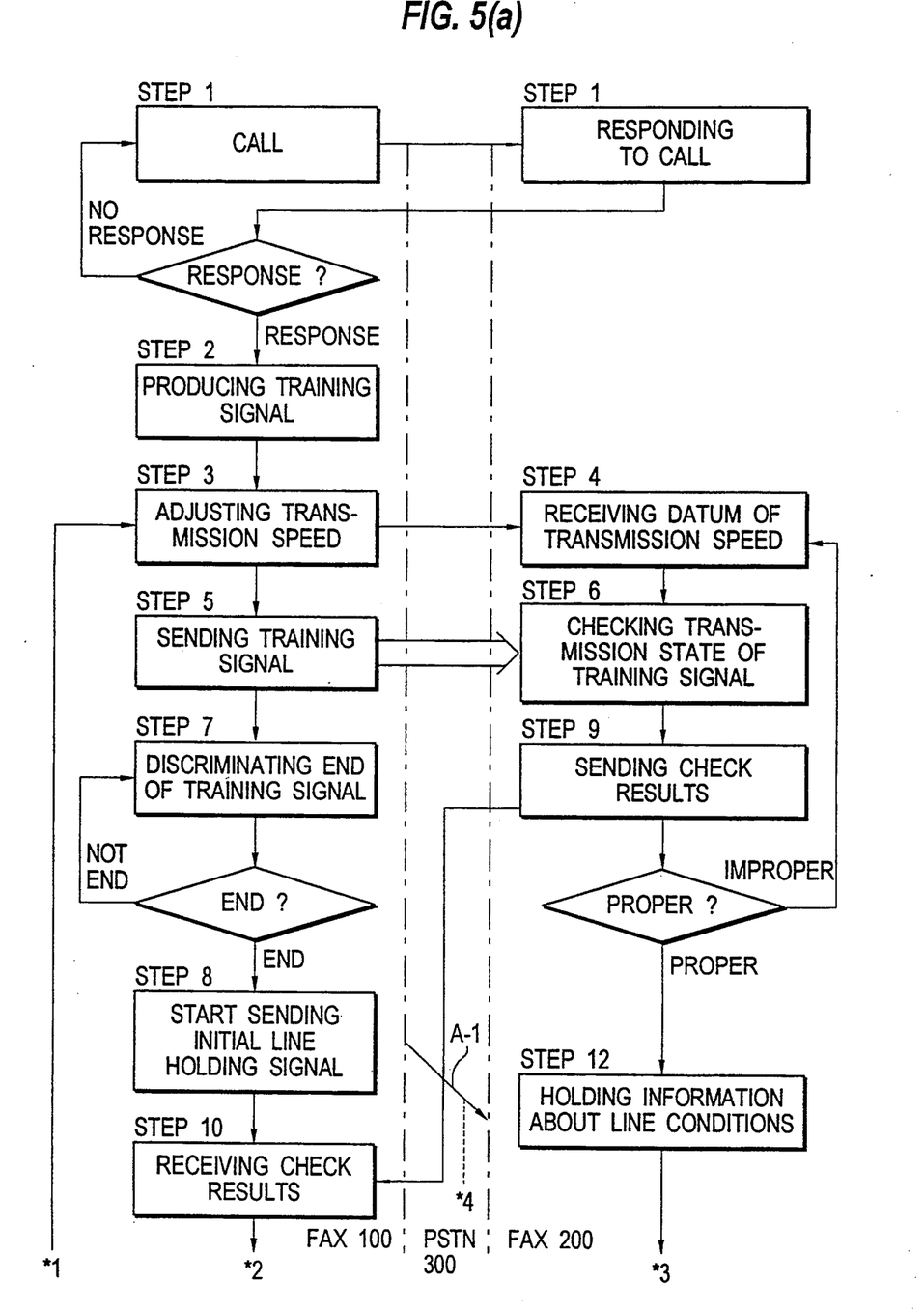
FIG. 5(a) is a part of the process flow chart for explaining the process performed in the preferred embodiment of the present invention.
Figure 5B:
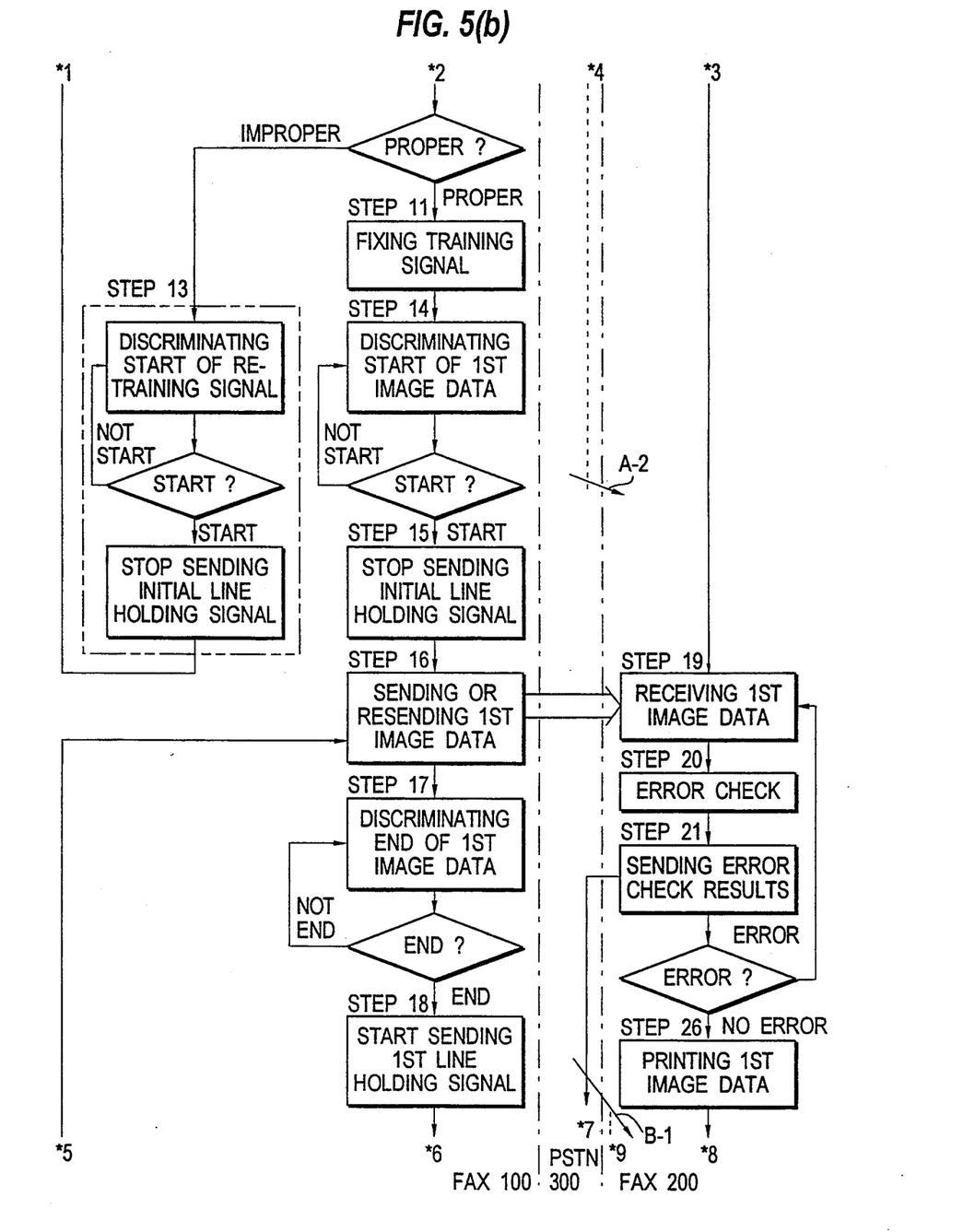
FIG. 5(b) is another part of the process flow chart for explaining the process performed in the preferred embodiment of the present invention.
Figure 5C:
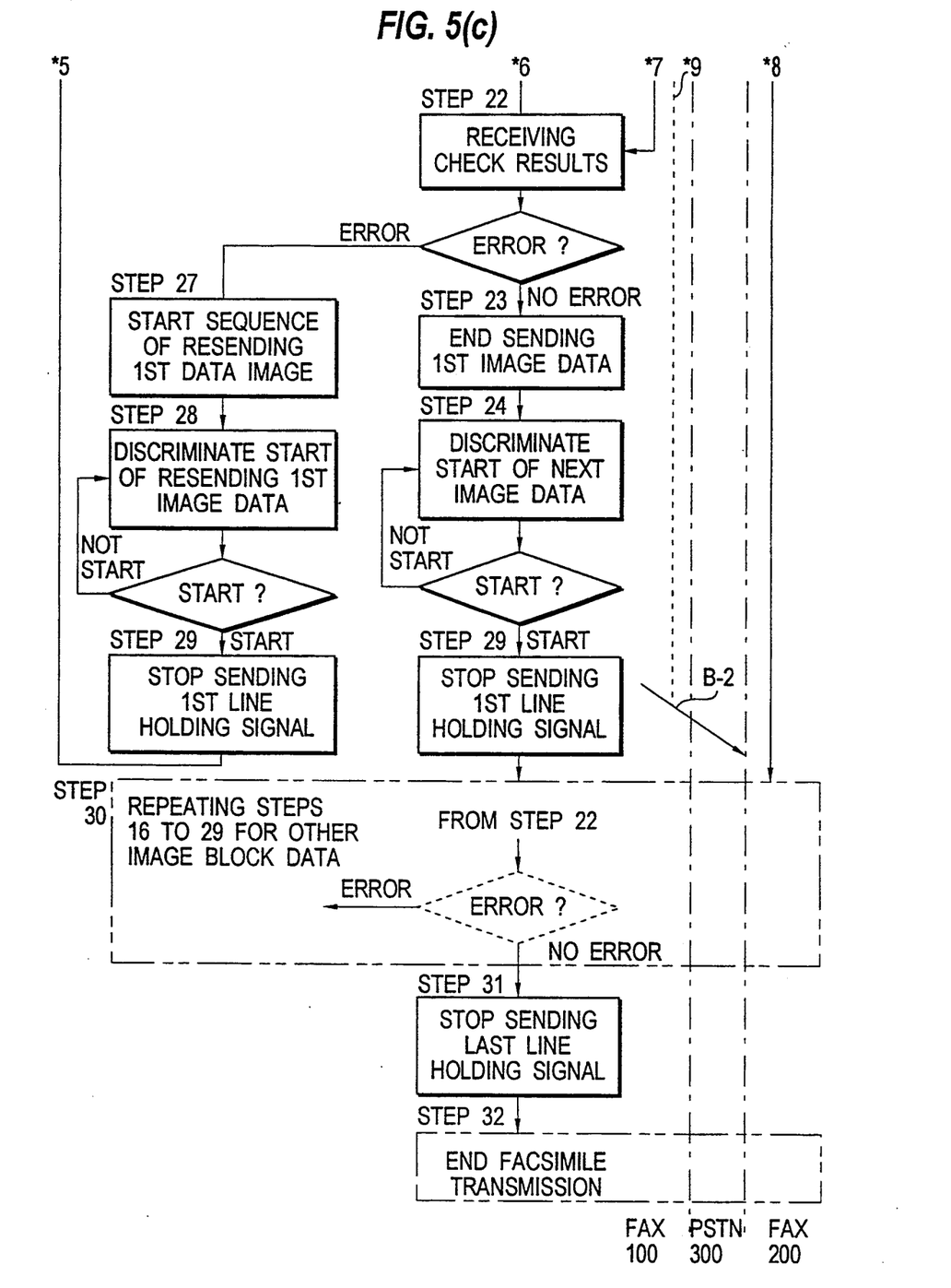
FIG. 5(c) is still another part of the process flow chart for explaining the process performed in the preferred embodiment of the present invention.

The preferred embodiment of the present invention will be explained in reference to FIGS. 4, 5(a), 5(b), 5(c) and 6. FIG. 4 is a schematic diagram of the facsimile equipment embodying the present invention, and FIGS. 5(a), 5(b) and 5(c) are the process flow charts for explaining the steps for transmitting the image block data from FAX 100 to FAX 200 in FIG. 4. In FIG. 4, a reference numeral which is the same as in FIG. 2 designates the same unit as in FIG. 2. However, in FIG. 4, there are units having the same reference numerals as in FIG. 2 but having no dash mark or single quote like 100, 200, 111, 211, 110 and 210. The units having no dash mark in FIG. 4 are functionally the same as the units having the dash mark in FIG. 2 respectively but are partially changed because of the present invention.

In FIG. 4, as in FIG. 2, the FAXes 100 and 200 are functionally the same as each other and connected through PSTN 300, and FAX 100 is in the transmission mode and FAX 200 is in the reception mode of the image block data.

In accordance with CCITT V.21, there are two kinds of low speed modulators and demodulators respectively in regard to the transmission control signals. One of the low speed modulators is V21-ch1 MOD and the other is V21-ch2 MOD, and one of the low speed demodulators is V21-ch1 DEM and the other is V21-ch2 DEM. The latter V21-ch2 MOD and DEM are used in the related art as shown in FIG. 2. In the present invention, however, not only the latter V21-ch2 MOD and DEM but also the former V21-ch1 MOD and DEM are used as a modulator and a demodulator for the line holding signals.

in FIG. 4, V21-ch1 MOD 113 is provided in FAX 100, for modulating the line holding signal sent from CONT 111, and V21-ch1 DEM 214 is provided in FAX 200 for demodulating the line holding signal sent from FAX 100 through PSTN 300. Switching of SWes 110 and 210 are performed under the control of CONTs 111 and 211 respectively when FAXes 100 and 200 are in the transmission and the reception mode of the image data respectively.

Although not depicted in FIG. 4, in the facsimile equipment, are devices for producing a starting signal and an ending signal of each image block datum, a starting signal and an ending signal of the series of the image block data and an ending signal of the training signal. In the facsimile equipment, the starting signal of the first image block datum coincides with the starting signal of the series of the image block data, and the ending signal of the last image block datum coincides with the ending signal of the series of the image block data. Because of providing the ending signal of the training signal and the starting signal of the first image block datum, a time period of sending the line holding signal, which will be called "initial line holding signal" hereinafter, between the end of the training signal and the start point of the first image block datum can be discriminated. Furthermore, when an image block datum is over, if the ending signal of the series of the image block data does not appear even though the ending signal of the image block datum appears, it can be discriminated that there is a no-signal space after the ending signal of the image block datum.

Figure 6:
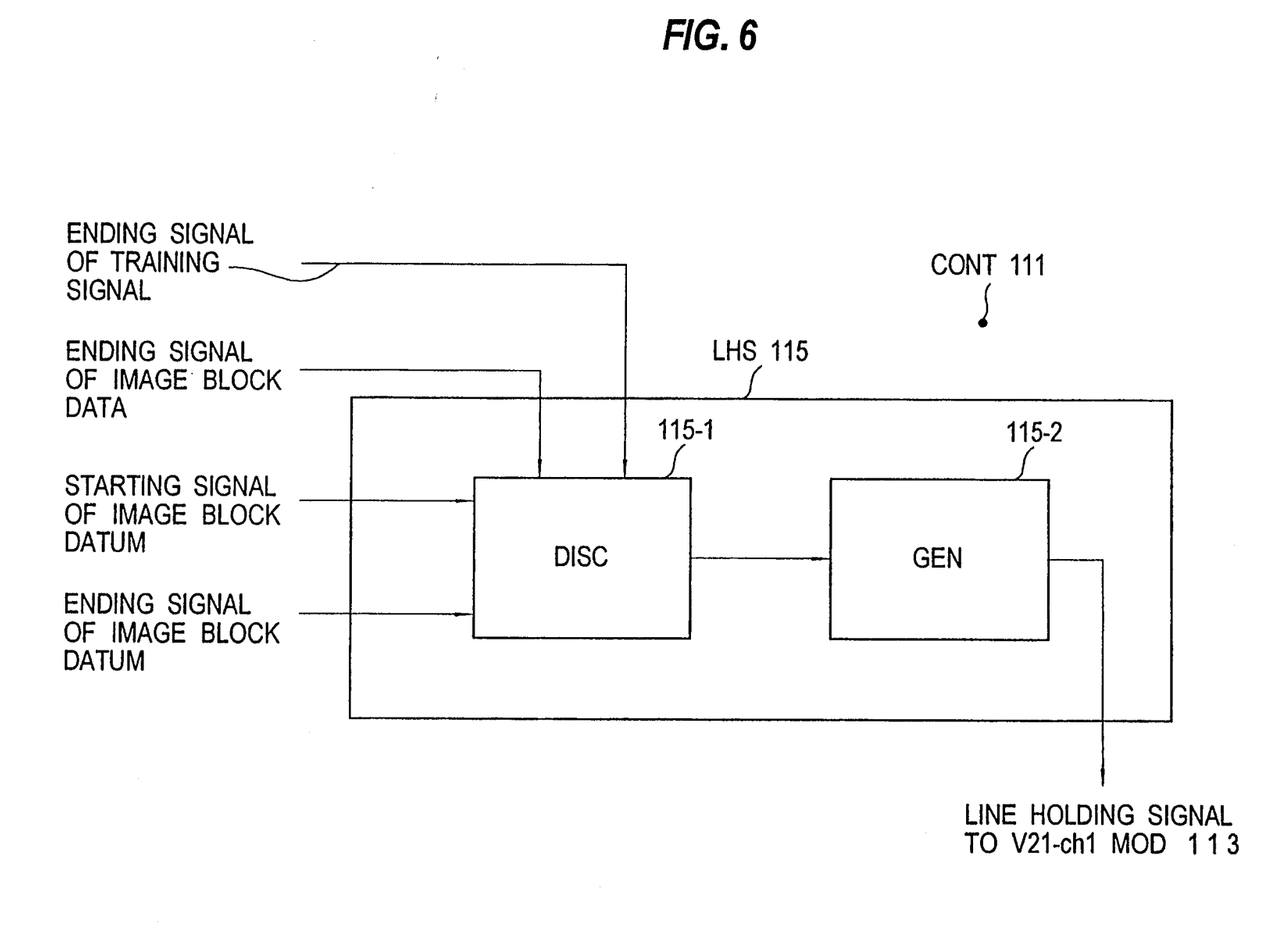
FIG. 6 is a schematic block diagram of a line holding signal generator (LHS GEN 115) used in the preferred embodiment of the present invention.

A circuit called a line holding signal generator (LHS GEN) for discriminating the no-signal space and generating the line holding signal during the discriminated no-signal space is provided in each or CONTs 111 and 211. In FIG. 4, a box 115 (215) is the LHS GEN in CONT 111 (211). FIG. 6 is a block diagram of LHS GEN 115 in which a discriminator (DISC 115-1) for discriminating the no-signal space and a generator (GEN 115-2) for generating the line holding signal during the discriminated no-signal space are provided. A starting point of the no-signal space is discriminated at DISC 115-1 by discriminating the ending signal of the training signal and by comparing the ending signal of the image block datum and the ending signal of the series of the image block data to each other, and an ending point of the no-signal space is discriminated by comparing the ending signal of the image block datum and the ending signal of the series of the block data.

In the above, a little or small period or space appearing between, for example, an actual end point of the training signal and an actual start point of the line holding signal is allowed to exist, because the signal insertion occurs only in the case where the no-signal space is longer than a designated period. This applies as well to compensate for a little period appearing between an actual end point of the initial line holding signal and an actual start point of the first image block datum.

A tone signal having a single frequency or a synthetic signal having a plurality of frequencies, such as Dual Tone Multi-Frequency (DTMF), can also be used for the line holding signal.

Furthermore, the line holding signal can be used for sending a message from CONT 111 to CONT 211 through V21-ch1 DEM 214. Therefore, using V21-ch2 MOD and DEM and V21-ch1 MOD and DEM in FAXes 100 and 200 respectively, the full duplex transmission can be performed between CONTs 111 and 211.

The process for transmitting the image block data from FAX 100 to FAX 200 is almost same as the process explained in steps 1' to 12' of the prior art, except the new steps for filling the no-signal spaces with the line holding signals are added to the prior art steps. The process steps for transmitting the image block data from FAX 100 to FAX 200 are explained as follows in reference to FIGS. 4, 5(a) 5(b), 5(c) and 6. FIGS. 5(a), 5(b) and 5(c) are joined together as indicated by asterisk marks having respective linking numbers. In the explanation of the following steps, words put in parentheses are written in boxes in the flow charts in FIGS. 5(*a*), 5(*b*) and 5(*c*).

Step 1 to (Call): The FAX 100 calls FAX 200 by sending CALL signal from CONT 111 to CONT 211 through V21-ch2 MOD 101, SW 109, Tx AMP 107, LTT 112, PSTN 300, LTT 212, Rx AMP 208, SW 209 and V21-ch2 DEM 202. The CONT 211 responds to CONT 111 by sending an answer signal relating to the call through V21-ch 2 MOD 201, SW 209, Tx AMP 207, LTT 212, PSTN 300, LTT 112, Rx AMP 108, SW 109 and V21-ch 2 DEM 102.

Step 2 for (Producing Training Signal): When CONT 211 responds to CONT 111 by informing same that FAX 200 is ready to receive data, the training sequence is performed by producing the training signal from FAX 100 to FAX 200 initially.

Step 3 for (Adjusting Transmission Speed): The transmission speed of the training signal is adjusted at H-S MOD 104 by estimating a proper speed for transmitting the training signal from FAX 100 to FAX 200 through PSTN 300. The datum of the transmission speed is sent from CONT 111 to CONT 211 through the same route as the CALL signal in step 1.

Step 4 for (Receiving Datum of Transmission Speed): The CONT 211 receives the datum of the transmission speed in step 3 and is used thereby for checking the transmission state of the training signal, as stated in a later step.

Step 5 for (Sending Training Signal): The training signal produced in CONT 111 in FAX 100 is sent to H-S DEM 205 in FAX 200 through H-S MOD 104, SWes 110 and 109, Tx AMP 107, LTT 112, PSTN 300, LTT 212, Rx AMP 208 and SWes 209 and 210.

Step 6 for (Checking Transmission State of Training Signal): In H-S DEM 205, the transmission state of the training signal is produced from the received training signal. The transmission state is held in the circuit at H-S DEM 205 and used thereby to demodulate the following image block data. The training signal is sent from H-S DEM 205 to CONT 211 and checked in CONT 211 whether the transmission state is proper for the transmission of the training signal, by checking for the existence of error in the received training signal.

Step 7 for (Discriminating End of Training Signal): The end of the training signal is discriminated in CONT 111 in FAX 100.

Step 8 to (Start Sending Initial Line Holding Signals: When the end of the training signal is discriminated in step 7, an initial line holding signal is started to be sent from CONT 111 to CONT 211 through V21-ch1 MOD 113, SWes 110 and 109, Tx AMP 107, LTT 112, PSTN 300, LTT 212, Rx AMP 208, SWes 209 and 210 and V21-ch1 DEM 214.

Step 9 for (Sending Check Results): When the check of the transmission state of the training signal is over at CONT 211 as stated in step 6, the check results are sent from CONT 211 to CONT 111 through the same route as the answer signal in step 1.

Step 10 for (Receiving Check Results): When CONT 111 receives the check results sent from CONT 211 in step 8, CONT 111 checks whether the results are proper for fixing the transmission speed of the training signal.

Step 11 for (Fixing Training Signal): If the results received in step 10 are proper, the transmission speed of the training signal is fixed; in other words, the transmission speed of the image block data to be sent from FAX 100 to FAX 200 is fixed.

Step 12 for (Holding Information about Line Condition): When the transmission state of the training signal is checked in step 6 and the check results are proper, the transmission state produced in H-S DEM 205 is held as it is or maintained unchanged so as to be matched to the line condition of PSTN 300, under the control of CONT 211, until the series of the image block data is all printed at FAX 200. If the check results in step 6 are improper, steps 4, 6 and 9 are repeated in FAX 200.

Step 13 for (Readjusting Speed of Training Signal): If the results received in step 10 are improper, the start point of the re-training signal is discriminated. When the re-training signal is allowed to be started, the initial line holding signal is stopped from being sent to FAX 200. This stop information is sent to step 3 for making steps 3 to 10 repeat.

Step 14 for (Discriminating Start of First Image Block Datum): When the transmission speed of the training signal is fixed in step 11, the start point of the first image block datum of the series of the image block data is discriminated.

Step 15 to (Stop Sending Initial Line holding Signal): When the start point of the first image block datum is discriminated, the initial line holding signal continued to be sent from FAX 100 to FAX 200 through the same route as the training signal in step 5 is stopped from being sent.

Step 16 for (Sending or Resending 1st Image Block Datum): When the initial line holding signal is stopped from being sent in step 15, the first image block datum of the series of the image block data is sent from FAX 100 to FAX 200 through the same route as the training signal in step 5, except that the image block datum is sent from CONT 111 to IMAGE COMP 103 before being sent to H-S MOD 104, because the image data read by the image reading unit is required to be compressed at IMAGE COMP 103.

Step 17 for (Discriminating End of 1st Image Block Datum): When the first image block datum is sent in step 16, the end point of the first image block datum is discriminated and the ending signal is sent to CONT 111.

Step 18 to (Start Sending 1st Line Holding Signal): When the ending signal of the first image block datum is produced in step 17, the first line holding signal is generated in CONT 111 and sent to V21-ch1 MOD 113 from which the modulated first line holding signal, which will be called simply the "first line holding signal", is sent to CONT 211 through the same route as in case of the initial line holding signal in step 8.

Step 19 for (Receiving 1st Image Block Datum): The first image block datum sent from FAX 100 to FAX 200 in step 16 is sent to CONT 211 through H-S DEM 205 and IMAGE DECOMP 206. The first image block datum is demodulated at H-S DEM 205, decompressed at IMAGE DECOMP 206 and sent to CONT 211 so as to be checked for determining whether errors exist in the received first image block datum.

Step 20 for (Error Check): The first image block datum received at FAX 200 and sent to CONT 211 in step 19 is checked to determine whether errors exist in the received first image block datum.

Step 21 for (Sending Error Check Results): The error check results obtained in step 20 are sent to CONT 111 in FAX 100 through the same route as in step 9.

Step 22 for (Receiving Check results): The CONT 111 receives the error check results sent in step 21 and determines whether there are errors in the error check results.

Step 23 for (End Sending 1st Image Block Datum): When the error check results include no error in step 22, the sending operation of the first image block datum is stopped by the control of CONT 111.

Step 24 for (Discriminating Start of 2nd Image Block Datum): When the sending operation is stopped in step 23, the start point of the second image block datum of the series of the image block data is discriminated in LHS GEN 115 of CONT 111.

Step 25 to (Stop Sending 1st Line Holding Signal): When the start point of the second image block datum is discriminated in step 24, the first line holding signal is stopped from being sent from FAX 100 to FAX 200 under the control of CONT 111.

Step 26 for (Printing 1st Image Datum): When the error check results obtained in step 20 include no error, the first image datum is printed by the printing unit in FAX 200 under the control of CONT 211.

Step 27 to (Start Sequence of Resending 1st Image Block Datum): If there are errors in the error check results received in step 23, the resending sequence of the first image block datum is started under the control of CONT 111.

Step 28 for (Discriminating Start of Resending 1st Image Block Datum): In order to perform the resending sequence stated in step 27, the start point of the first image block datum to be resent is discriminated in FAX 100.

Step 29 to (Stop Sending 1st Line Holding Signal): When the start point is discriminated in step 28, the first line holding signal is stopped from being sent from FAX 100 to FAX 200 under the control of CONT 111. Then the first image block datum is resent from FAX 100 to FAX 200 by repeating steps 16 to 22.

Step 30 for (Repeating Steps 16 to 29 for Other Image Block Data in Series of Image Block Data): When the first line holding signal is stopped from being sent from FAX 100 to FAX 200 in step 25, other remaining image block data of the series of the image block data are sent from FAX 100 to FAX 200 individually by repeating the same steps as steps 16 to 29, except as to steps 23, 24 and 25 which relate to the last image block datum of the series of the image block data.

Step 31 to (Stop Sending Last Line Holding Signal): When it is confirmed in step 22 for the last image block datum that there is no error in the last image block datum sent from being FAX 200, the last line holding signal is stopped to sent from FAX 100 to FAX 200 any more.

Step 32 to (End Facsimile Transmission): Then, the facsimile transmission for sending the series of the image block data is ended.

In the steps explained above, the steps concerning the line holding signals are the new steps performed in accordance with the present invention. The steps 8 and 15 are for filling the no-signal space with the line holding signal during the sending sequence of the training signal, which is shown by two arrows A-1 and A-2 linked by a dotted line, and the steps 18 and 25 are for filling the no-signal space with the line holding signal during the sending sequence of the first image block datum, which is shown by two arrows B-1 and B-2 linked by a dotted line. By applying such new steps to the prior steps, the signal insertion never occurs.

Furthermore, as stated in the above steps, it is required that the training signal and the image block data are received at H-S DEM 205 and the line holding signal is received at V21-ch1 DEM 214. Thus, the training signal and the line holding signal must be distinguished from each other. For this distinguishment, the carrier frequency of the training signal is required to be different from that of the line holding signal. The reason why V21-ch1 is applied to the line holding signal in distinction or instead of using the H-S signal which depends on V.29 is for satisfying the above requirement of distinguishing the line holding signal from the training signal. As an another method, the above object can be achieved by separating the frequency bands used for modulating the respective signals.

In the above flow charts in FIGS. 5(a), 5(b) and 5(c), or it has not been explained the flow of signals and data by indicating that the circuit switching performed at SWes 109, 110 and 209, 210 is under the control of CONTs 111 and 211 respectively. This was done to prevent the explanation of the flow chart from becoming too complicated. In FIG. 4, SWes 109 and 209 show a case where the control signal is transmitted from CONT 111 to CONT 211 through V21-ch2 MOD 101 in FAX 100 and V21-ch2 DEM 202 in FAX 200, and SWes 110 and 210 show a case wherein FAXes 100 and 200 are in the transmission mode and the reception mode respectively.

The preferred embodiment of the present invention has been explained by using the facsimile equipment as an example. However, the present invention is not limited to facsimile equipment. The present invention can be applied to any data transmission equipment as long as the equipment transmits the block data consisting of more than two block data including the no-signal space between the block data adjacent to each other.

What is claimed is:

1. A data communication equipment for transmitting a data signal containing a series of block data including two successive block data and a time space having no signal, occurring between the two successive block data, the time space being in excess of an allowed time period of a no signal condition and being subject to insertion therein of a different signal having at least the potential of altering the block data of the transmitted data signal and introducing errors therein, said data communication equipment comprising:

discrimination means for discriminating the existence of a time space in the series of block data and producing a corresponding discrimination output;

means for generating a line hold signal; and transmission means, responsive to the discrimination output, for inserting and transmitting the line holding signal during the time space discriminated by said discrimination means in the series of block data, the line holding signal filling the no signal time space and preventing the insertion therein of a different signal, the line holding signal not having the potential of altering the block data of the transmitted data signal and thus not introducing errors therein.

2. A data communication equipment according to claim 1, wherein said line holding signal inserted and transmitted by said transmission means has a single frequency.

3. A data communication equipment according to claim 1, wherein said line holding signal inserted and transmitted by said transmission means comprises a synthetic signal having a plurality of frequencies.

4. A data communication equipment according to claim 1, wherein:
   said two successive block data include a start signal and a first end signal;
   the series of block data includes a second end signal;
   said discrimination means comprises a discriminator for discriminating the time space using the first end signal of each of said two successive block data, the second end signal of the series of block data and the start signal of each of said two successive block data, for determining a start point of the time space by confirming that only the first end signal appears in said two successive block data when the two successive block data have been transmitted and for determining an end point of the time space by confirming that the start signal appears in said two successive block data.

5. A communication equipment for transmitting a data signal containing a series of block data along a transmission line, said series of block data including at least first and second block datum separated by a no-signal time space, longer than an allowed no-signal time period in the transmission line and the no-signal time space thereby being subject to insertion therein of a signal different from the data signal, said transmission line having transmission characteristics subject to being varied by the different signal, when inserted into the no-signal time space and transmitted thereby with the data signal along the transmission line, said communication equipment comprising:
   discrimination means for discriminating the no signal time space;
   production means for producing and inserting a first signal into the no-signal time space discriminated by said discrimination means and for indicating to the transmission line that the first signal appears during the no-signal time space; and
   transmission means for transmitting the first signal along the transmission line by producing a first time space between a first end time of the first block datum and a first start time of the first signal and a second time space between a second end time of the first signal and a second start time of the second block datum, said first and second time spaces each being shorter than the allowed no signal time period.

6. A communication system for transmitting a series of block data along a transmission line, said series of block data including block datum and at least one no-signal time space which is longer than an allowed time period of a no-signal condition in the transmission line and said transmission line having transmission characteristics which are varied by the no-signal time space, said communication system comprising:
   receiving equipment which receives the series of block data transmitted through the transmission line and comprises:
      generating means for producing an answer signal responding to one of the block datum in the series of block data, and
      first sending means for sending the series of block data and the answer signal from said receiving equipment; and
   transmitting equipment, connected to said receiving equipment, which transmits the series of block data received from said first sending means and comprises:
      reception means for receiving the series of block data and the answer signal from said receiving equipment,
      transmission means for transmitting the series of block data received from said reception means, wherein said transmission means begins transmitting each of the block datum of the series of block data after said reception means receives the answer signal,
      discrimination means for discriminating the at least one no-signal time space in said series of block data received by said reception means,
      production means for producing and inserting a first signal into the at least one no-signal time space discriminated by said discrimination means and for indicating to the transmission line that the first signal appears during the at least one no-signal time space, and
      second sending means for sending the first signal to said receiving equipment through the transmission line by producing a first time space between a first end time of the one of the block datum and a first start time of the first signal and a second time space between a second end time of the first signal and a second start time of another of the block datum, said first and second time spaces each being shorter than the allowed no-signal period.

7. A communication system according to claim 6, wherein the first signal, as produced by said producing means, is distinguishable from the series of block data, said first sending means of said receiving equipment sending the answer signal, of the series of block data, to said transmitting equipment after distinguishing the first signal from the series of block data.

8. A communication system according to claim 7, wherein:
   the series of block data is transmitted from said transmitting equipment at a carrier frequency and comprises a first transmission signal within a transmission frequency band of the transmission line and said first transmission signal is produced by modulating carrier signals including a first carrier signal and is limited to a designated transmission frequency band; and
   the first signal comprises a second transmission signal within the designated transmission frequency band and a synthetic signal having frequencies including a first frequency different from the carrier frequency of the series of block data.

9. A communication system according to claim 7, wherein:
   the series of block data transmitted from said transmitting equipment comprises a first transmission signal within a first transmission frequency band of the transmission line and said first transmission signal is produced by modulating carrier signals including a first carrier signal and is limited to a designated transmission frequency band; and
   the first signal comprises a second transmission signal having a second transmission frequency band which is outside of said designated transmission frequency band but within the first transmission frequency band of the transmission line.

10. A communication system according to claim 6, wherein the first signal, as produced by said producing means, is distinguishable from the answer signal received from said receiving equipment, and said transmitting equipment further comprises interference means for preventing interference caused by the first signal when said reception means in said transmission equipment receives the answer signal.

11. A communication system according to claim 6, wherein:
   said receiving equipment further comprises first compensating means for compensating a transmission state of the series of block data to match data transmission characteristics of the transmission line, by producing difference information indicating a difference between the transmission state of the series of block data and the transmission characteristics, and for sending said difference information; and
   said transmitting equipment further comprises second compensation means for compensating the transmission state of the series of block data to match the data transmission characteristics of the transmission line, by varying a transmission speed of the series of block data, responsive to the difference information sent by and received from said receiving equipment.

12. A data communication apparatus wherein data is transmitted as a series of successive block data along transmission line, successive block data being separated by a no signal time space which, if longer than an allowed no signal time period on the transmission line, permits insertion of a signal, different from the data signal, in the no signal time space, comprising:
   a transmitter transmitting two successive data blocks, spaced apart by a time interval having a no signal time space; and
   means for determining whether said time interval of the no signal time space, which spaces apart said two successive data blocks as transmitted by said transmitter, exceeds the allowed no signal time period and is responsive thereto for transmitting a line holding signal during said time interval, which prevents signal insertion of the different signal into said no signal time space.

13. A data communication apparatus according to claim 12, wherein the data communication apparatus further comprises:
   a receiver which receives the successive block data and the respective no signal time spaces therebetween and, in response, transmits an answer signal to the transmitter, confirming receipt of a first of said two data blocks, during said time interval; and
   said transmitter transmits said line holding signal to said receiver during said time interval in which said corresponding answer signal is transmitted.

14. A data communication method wherein data is transmitted as a series of successive block data along a transmission line, successive block data being separated by a no-signal time space which, if longer than an allowed no signal time period on the transmission line, permits insertion of a signal, different from the data signal, in the no signal time space, comprising the steps of:
   (a) transmitting two successive data blocks spaced apart by a time interval having a no signal time space;
   (b) determining whether the time interval which spaces apart the two successive data blocks, is longer than the allowed no signal time period; and
   (c) transmitting a line holding signal during the time interval when the time interval exceeds the allowed no signal time period and thereby preventing insertion of a difference signal into the no signal time space.

15. A data communication method according to claim 14, wherein said data communication method further comprises the step of:
   receiving the two successive data blocks and, in response to the receipt of the first thereof, transmitting an answer signal to the transmitter for confirming receipt of the first of the two data blocks of data during the time interval; and
   transmitting the line holding signal and the answer signal during the time interval.

* * * * *

UNITED STATES PATENT AND TRADEMARK OFFICE
CERTIFICATE OF CORRECTION

PATENT NO. : 5,357,543
DATED : October 18, 1994
INVENTOR(S) : Shinichi HINOKIMOTO It is certified that error appears in the above-indentified patent and that said Letters Patent is hereby corrected as shown below:

Col. 1,  after the title, insert --BACKGROUND OF THE INVENTION--;
line 7, after "to" delete "a".

Col. 2,  line 7, change "without errors" to --as--;
line 8, delete "instead of"; and change "as" to --without errors instead of--.

Col. 5,  line 56, after "200'" insert --,--;
line 59, after "passed" insert --,--.

Col. 7,  line 58, change "in" (first occurrence) to --In--;
line 68, after "are" insert --conventional--.

Col. 8,  line 12, after "called" insert --an--;
line 24, change "or" to --of--;
line 26, begin a new paragraph with "FIG. 6".

Col. 9,  line 48, change "Signals:" to --Signal):--.

Col. 11, line 49, change "from being" to --to--;
line 50, change "to" (first occurrence) to --from being--.

Col. 13, line 5, after "signal;" insert --and--.

UNITED STATES PATENT AND TRADEMARK OFFICE
CERTIFICATE OF CORRECTION

PATENT NO. : 5,357,543
DATED : October 18, 1994
INVENTOR(S) : Shinichi HINOKIMOTO It is certified that error appears in the above-indentified patent and that said Letters Patent is hereby corrected as shown below:

Col. 15, line 25, after "along" insert --a--;
         line 39, after "signal" insert --,--.

Signed and Sealed this

Tenth Day of January, 1995

Attest:

BRUCE LEHMAN

Attesting Officer     Commissioner of Patents and Trademarks